UNITED STATES PATENT OFFICE.

JOHN D. WARREN, OF LYNDONVILLE, NEW YORK.

VEGETABLE-SOUP COMPOUND AND PROCESS OF PREPARING.

SPECIFICATION forming part of Letters Patent No. 247,447, dated September 20, 1881.

Application filed May 11, 1881. (No specimens.)

*To all whom it may concern:*

Be it known that I, JOHN D. WARREN, of Lyndonville, in the county of Orleans and State of New York, a citizen of the United States, have made certain Improvements in Vegetable-Soup Compounds as a permanent article of food and commerce, of which the following is a specification.

This invention relates more particularly to beans and pease, and to combining with them and other vegetables certain antiseptics and preservatives, so that such vegetables, when dried and prepared and so combined, can be kept sweet under all circumstances for use in making soup, all as hereinafter more fully explained.

As an art, preserving vegetables and other food has long existed; but the various substances, being subject to subtle causes, often become spoiled, moldy, wormy, &c, and the delicate and natural flavor which they originally possessed lost or impaired by deleterious organic or other causes.

In a previous patent, issued to me on January 4, 1881, No. 236,284, I have described a preservative consisting of salicylic acid and sulphate of soda. In the following I use sulphite of soda and have added another element.

Evaporated vegetables, fruits, &c., have been long put up for various uses; but owing to varying conditions of temperature, especially humidity, such are apt to absorb moisture, become moldy, and by these and other agencies decay or give off offensive odors and impart them to materials associated therewith in cooking. There is no doubt of the utility and value of such compounds if they will keep sweet.

In soups properly prepared there should be a preponderance of the particular flavor by which such soup is designated. For example, vegetable soup should be distinguished by its own flavor, bean soup by its peculiar bean flavor, and pea soup by its own; and also that no disagreeable taste should be developed, even when kept a long time and then cooked. Such compounds would be of great value for the army, naval, and the merchant service, as on long voyages they would greatly conduce to health, being eminently anti-scorbutic.

In preparing the vegetables, my process includes washing, paring, and cutting in small squares by special machines. They are then boiled in a solution of caustic potash, and after being washed in pure water they are spread on sieves and put in an evaporator or hot-air chamber, then exposed to a varying temperature of at least 150° Fahrenheit until thoroughly evaporated, and afterward ground to a fine powder.

In preparing beans and pease for soup purposes, my process includes boiling beans or pease in a solution of caustic potash for about twenty minutes, then immersing them for about twenty minutes in pure boiling water, then putting them in sieves and evaporating in a temperature of not less than 150° Fahrenheit. During the process of evaporation the cortical portion of beans or pease will become to a great extent non-adherent. The beans or pease are crushed or semi-ground, the remains of the cortical removed by fans or other devices, the remaining part powdered ready for treatment to preserve, or to arrest that obscure organic reaction whereby evaporated and ground pease and beans become moldy and unfit for use, (which is the cause of their having been discarded from use hitherto,) and to prevent the attacks of insects. To effectually preserve the articles named, I mix with the powder (either of beans, pease, or vegetables) an antiseptic and preservative mixture composed of salicylic acid, acid sulphate of potassium, and sulphite of soda, in about the following proportions to each pound of the powdered vegetable, or pease or beans, viz: salicylic acid, twenty grains; acid sulphate of potassium, ten grains; sulphite of soda, ten grains. This must all be thoroughly mixed in order that this antiseptic and preservative mixture shall come in complete contact with all the particles of the pease, beans, &c.

In the above-described process the boiling of the vegetables, &c., in a solution of caustic potash, the thorough washing in pure water afterward, the thorough evaporation at a temperature of not less than 150° Fahrenheit, the removal of the cortical portion of the beans and pease, the grinding to a powder after being so prepared, and the addition and admixture of the antiseptic and preservative mixture are all important and essential parts of my discovery or invention.

I do not desire to limit myself to the exact proportions of the foregoing formula.

The proper preparation of the vegetables, pease, or beans is quite important; but dried fruits and vegetables are well known; but to properly prepare them in a ground state and then preserve them and keep them sweet, so that after a long period they shall be free from mold, worms, or any damaging agent, is the main object of my invention.

The object and use of the different chemical agents are as follows: Salicylic acid prevents any putrefying or fermentative action, &c. The acid sulphate of potassium, by combining with the phosphates or other salts present in the mixture, tends to keep the salicylic acid in a free state. The sulphite of soda aids in arresting decomposition and destroying low forms of organic life. The solution of caustic potash in which the vegetables, pease, and beans are boiled dissolves to a certain extent that chemical constituent in the beans and pease and vegetables which contributes first to fermentative deterioration.

I am aware that salicylic acid, sulphite of sodium, and acid sulphate of potassium have been long known and used as preservatives. I make no broad claim to them as such, but only in connection with pease, beans, or other vegetables, prepared as described and in the manner set forth.

I claim—

1. A dried and ground compound for use as vegetable soup, consisting of beans, pease, or other vegetables thoroughly evaporated and finely ground or powdered, combined with salicylic acid, acid sulphate of potassium, and sulphite of soda for preservatives, substantially as set forth.

2. The process described of preparing a vegetable compound for use in soups, consisting in first boiling the beans, pease, &c., in a solution of caustic potash, then cleansing them, then thoroughly evaporating them at a high temperature, then finely grinding them, and finally mixing therewith the preservatives, which are salicylic acid, acid sulphate of potassium, and sulphite of soda, as set forth.

In witness whereof I have hereunto signed my name in the presence of two subscribing witnesses.

JOHN D. WARREN.

Witnesses:
  H. M. HARD,
  N. S. RICE.